US012541670B2

(12) United States Patent
Kutt et al.

(10) Patent No.: US 12,541,670 B2
(45) Date of Patent: Feb. 3, 2026

(54) OPTIMIZED ADAPTIVE POOLING LAYER HYPERPARAMETERS FOR VARIABLY SIZED INPUTS

(71) Applicant: Palo Alto Networks, Inc., Santa Clara, CA (US)

(72) Inventors: Brody James Kutt, San Jose, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 465 days.

(21) Appl. No.: 17/661,378

(22) Filed: Apr. 29, 2022

(65) Prior Publication Data

US 2023/0351143 A1   Nov. 2, 2023

(51) Int. Cl.
| | | |
|---|---|---|
| *G06F 40/30* | (2020.01) | |
| *G06F 40/205* | (2020.01) | |
| *G06F 40/284* | (2020.01) | |
| *G06N 3/02* | (2006.01) | |
| *G06N 3/04* | (2023.01) | |

(Continued)

(52) U.S. Cl.
CPC ............ *G06N 3/04* (2013.01); *G06F 40/205* (2020.01); *G06F 40/284* (2020.01); *G06F 40/30* (2020.01); *G06N 3/02* (2013.01); *G06N 3/08* (2013.01); *G06N 3/084* (2013.01); *G06N 3/09* (2023.01); *G06N 3/0464* (2023.01); *G06N 3/048* (2023.01)

(58) Field of Classification Search
None
See application file for complete search history.

(56) References Cited

U.S. PATENT DOCUMENTS

| | | | |
|---|---|---|---|
| 11,074,412 B1* | 7/2021 | Leeman-Munk | ........ G06N 3/08 |
| 2019/0205738 A1* | 7/2019 | Bannon | .................. G06N 20/00 |

(Continued)

FOREIGN PATENT DOCUMENTS

| | | | | |
|---|---|---|---|---|
| CN | 111553347 A | * | 8/2020 | ......... G06F 18/2415 |
| CN | 114020917 A | * | 2/2022 | ............. G06N 3/047 |

OTHER PUBLICATIONS

X. Ouyang, K. Gu and P. Zhou, "Spatial Pyramid Pooling Mechanism in 3D Convolutional Network for Sentence-Level Classification," in IEEE/ACM Transactions on Audio, Speech, and Language Processing, vol. 26, No. 11, pp. 2167-2179, Nov. 2018, doi: 10.1109/TASLP.2018.2852502. (Year: 2018).*

(Continued)

*Primary Examiner* — Richa Sonifrank
(74) *Attorney, Agent, or Firm* — Gilliam IP PLLC

(57) ABSTRACT

Adaptive pooling layers for compressing variably sized inputs use window sizes and stride lengths specific to variable input size and fixed output size at the pooling layer. A naïve and an optimal adaptive pooling algorithm disclosed herein determine window size and stride length for variable sized inputs while minimizing window size and ensuring no padding is used in the output representation. These adaptive pooling algorithms are implemented in a pipeline for text document classification involving a natural language processor that generates embedding vectors for variably sized text documents and at least one of the adaptive pooling algorithms at a first adaptive pooling layer of a classification neural network to process the embedding vectors.

20 Claims, 8 Drawing Sheets

(51) Int. Cl.
*G06N 3/0464* (2023.01)
*G06N 3/048* (2023.01)
*G06N 3/08* (2023.01)
*G06N 3/084* (2023.01)
*G06N 3/09* (2023.01)

(56) References Cited

U.S. PATENT DOCUMENTS

| | | | |
|---|---|---|---|
| 2021/0144110 A1* | 5/2021 | Tseng | G06V 20/20 |
| 2021/0158132 A1* | 5/2021 | Huynh | G06N 3/0464 |
| 2021/0264250 A1* | 8/2021 | Singh | G06N 3/04 |
| 2022/0012569 A1* | 1/2022 | Plebani | G06N 3/10 |
| 2022/0366144 A1* | 11/2022 | Reisswig | G06F 40/131 |
| 2022/0383181 A1* | 12/2022 | Prieditis | G06N 7/01 |
| 2023/0259743 A1* | 8/2023 | Sanchez | G06N 3/0464 |
| | | | 706/27 |
| 2023/0351143 A1* | 11/2023 | Kutt | G06N 3/045 |
| 2025/0022314 A1* | 1/2025 | Wei | G06V 10/764 |

OTHER PUBLICATIONS

Xi Ouyang; Kang Gu; Pan Zhou; Spatial Pyramid Pooling Mechanism in 3D Convolutional Network for Sentence-Level Classification; Jul. 19, 2018; URL: https://ieeexplore.ieee.org/stamp/stamp.jsp?tp=&arnumber=8413124 (Year: 2018).*

* cited by examiner

OPTIMIZED ADAPTIVE POOLING LAYER HYPERPARAMETERS FOR VARIABLY SIZED INPUTS

BACKGROUND

The disclosure generally relates to computing arrangements based on specific computation models (e.g., CPC G06N) and using neural network models (e.g., CPC G06N3/04).

Natural language processing (NLP) is a field dedicated to the study of computer interpretation of natural languages. This takes the form of speech recognition, text classification, text-to-speech translation, etc. For text classification, documents are parsed for string tokens and string tokens are converted to embedded numerical feature vectors. These embeddings that map parsed strings to numerical space preserve semantic similarity between strings in the resulting numerical space. Text documents with similar classifications and/or content may vary with respect to size and format.

Pooling layers are layers in neural networks that apply pooling operations over specified regions of input features ("windows"). Pooling applies within each window and windows are incremented by a stride length that determines spacing between each window (i.e., all the windows have a same size and are separated by the stride length which may vary across pairs of windows). In the context of neural networks for NLP, each input at a pooling layer is a set of numerical feature vectors and the windows are intervals of consecutive numerical feature vectors over which to apply pooling operations. These windows are typically chosen to have a fixed size with a fixed stride length between windows. Example pooling operations include reducing columns of a window down by their average or minimum. When the inputs have variable size, adaptive pooling layers are used that adapt by varying window size and stride length depending on input size.

BRIEF DESCRIPTION OF THE DRAWINGS

Aspects of the disclosure may be better understood by referencing the accompanying drawings.

DESCRIPTION

Figure 1:
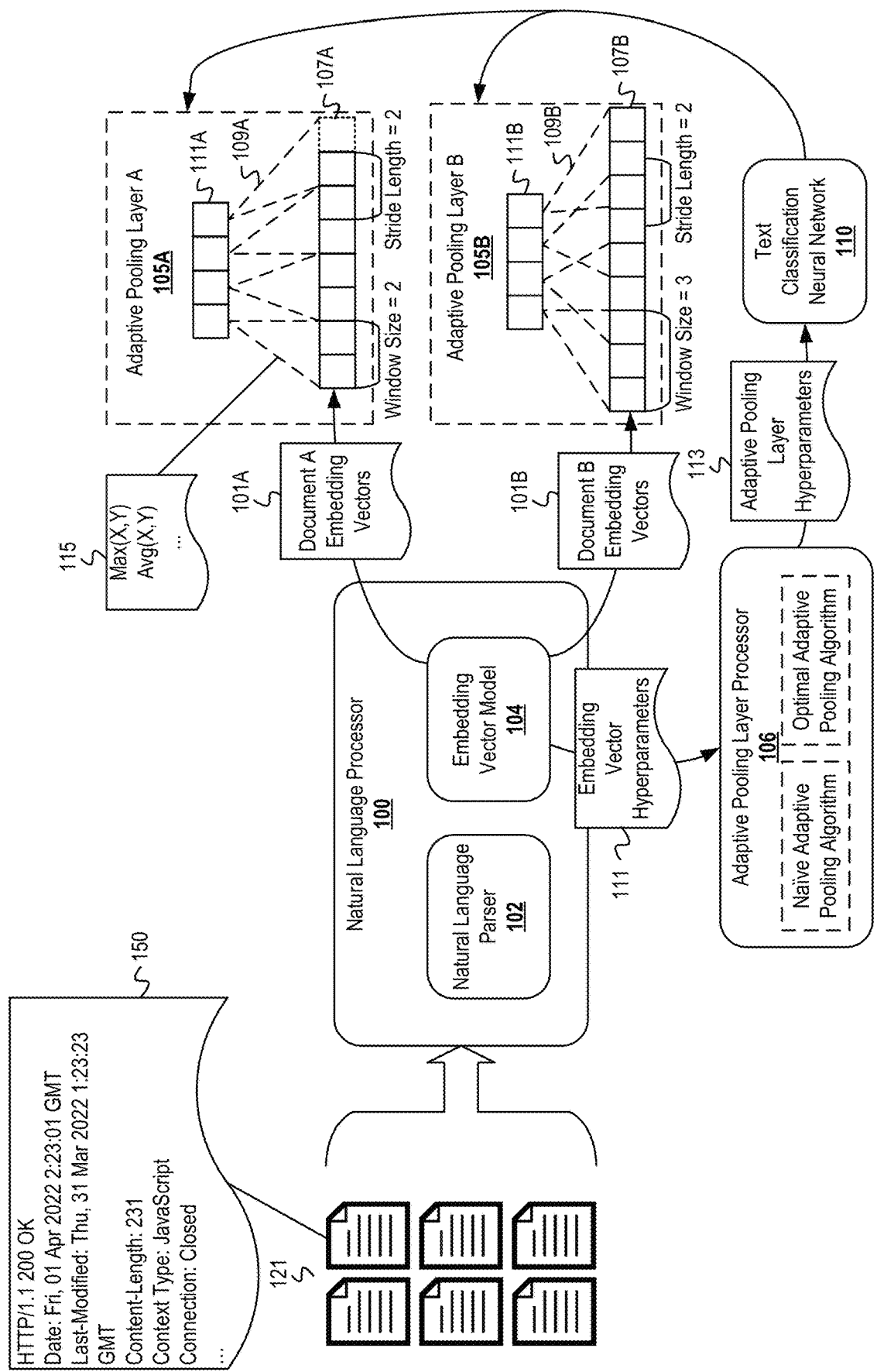
FIG. 1 depicts a schematic diagram of an example system for generating adaptive pooling layers using naïve and optimal adaptive pooling algorithms.

The description that follows includes example systems, methods, techniques, and program flows that embody aspects of the disclosure. However, it is understood that this disclosure may be practiced without these specific details. For instance, this disclosure refers to using naïve and optimal adaptive pooling algorithms to determine window sizes and stride lengths in implementations of a first adaptive pooling layer in a neural network for text document classification in illustrative examples. Aspects of this disclosure can be instead applied to implementations of adaptive pooling layers for other machine learning problems/neural network architectures and using other algorithms for determining window size and stride length. In other instances, well-known instruction instances, protocols, structures and techniques have not been shown in detail in order not to obfuscate the description.

Overview

Capturing semantic information in text documents using natural language processing poses technical and computational challenges when the size of these text documents varies by orders of magnitude. To exemplify, for neural network classifiers, a first network layer can be used to compress large documents using pooling with a fixed compression ratio so that every document has a uniform size. However, compressing by a fixed ratio causes smaller documents to get padded with thousands or even millions of zeroes to match the size of larger documents after the compression. This means that smaller documents are overcompressed and lose semantic information related to context that would otherwise affect classification. Additionally, padding every input to have the same size as the largest input causes training to slow down by an order of magnitude when documents have highly variable sizes. Adaptive pooling algorithms address this problem by modifying the window size and stride (and, therefore, the compression ratio) based on sizes of each input. Existing adaptive pooling algorithms suffer from deficiencies where windows frequently overlap and/or the sizes of the inputs to the adaptive pooling layers are forced to be multiples of the size of the outputs. The present disclosure proposes a naïve and an optimized adaptive pooling algorithm that determine a fixed window size and stride length for each input and output size so that window size is minimized, window overlap is reduced, and no padding is used in the output representation.

For the proposed adaptive pooling algorithms, the adaptive pooling layers act as a first layer in a neural network that compresses the text documents to a uniform size before sending outputs of the adaptive pooling layers through the remaining network layers, allowing for classification across variably sized text documents. Each of a naïve and an optimal adaptive pooling algorithm, given a number of embedding vectors as inputs, determine a window size and stride length such that the correct output size is achieved after pooling. For the naïve adaptive pooling algorithm, the window size is chosen equal to the stride length (so that no windows intersect) as the integer ceiling of the ratio input size/output size. For the optimized adaptive pooling algorithm, choosing "acceptable" window size and stride length (i.e., that yield a correct output size for the given input size)

while minimizing window size is formulated as an integer linear program, and two candidate solution pairs (i.e., integer window size/stride length pairs) to the integer linear program are chosen such that one of them is guaranteed to yield the optimal (i.e., lowest window size) solution. The choices of window size and stride length given by the naïve and optimal adaptive pooling algorithms demonstrate marked improvement in the context of text document classification for preserving semantic content during compression at an adaptive pooling layer across variably sized inputs.

Example Illustrations

FIG. 1 depicts a schematic diagram of an example system for generating adaptive pooling layers using naïve and optimal adaptive pooling algorithms. A natural language processor 100 receives text documents 121 and uses a natural language parser 102 and an embedding vector model 104 to generate embedding vectors for the text documents 121. The natural language processor 100 communicates embedding vector hyperparameters 111 to an adaptive pooling layer processor 106. The adaptive pooling layer processor 106 implements at least one of a naïve adaptive pooling algorithm and an optimal pooling algorithm to determine window sizes and stride lengths for adaptive pooling layers corresponding to generated embedding vectors parametrized by the embedding vector hyperparameters 111. Both the naïve and optimal adaptive pooling algorithms generate hyperparameters for adaptive pooling layers such that padding, window size, and window overlap are reduced, resulting in higher fidelity and efficiency for representations of semantic content in compressed embedding vectors for the text documents 121 at the adaptive pooling layers and, consequently, higher accuracy classifications. The adaptive pooling layer processor 106 communicates the window sizes and stride lengths to a text classification neural network (hereinafter "classifier") 110 as adaptive pooling layer hyperparameters 113. The classifier 110 uses the adaptive pooling layer hyperparameters 113 to generate adaptive pooling layers according to corresponding windows and stride lengths. While the adaptive pooling layers such as adaptive pooling layer A 105A and adaptive pooling layer B 105B are depicted as separated components, this is an abstraction for illustrative purposes and both layers 105A, 105B are iterations of a same dynamic layer configured to determine window sizes and stride lengths, perform pooling operations, and send outputs of the pooling layers to a same channel across inputs.

The natural language processor 100 comprises the natural language parser 102 and the embedding vector model 104 for preprocessing the text documents 121. The natural language parser 102 parses the text documents 121 to generate tokens corresponding to substantive strings. For instance, the natural language parser 102 can remove American Standard Code for Information Interchange (ASCII) characters with specified codes (e.g., outside the range of alphanumeric codes), can group consecutive allowable ASCII characters above a threshold length (e.g., 2) as tokens, can discard tokens not found from a database of allowable tokens (e.g., an index of English words), etc.

An example text document 150 comprises a Hypertext Transfer Protocol (HTTP) response to an HTTP GET request to a Uniform Resource Locator (URL) over the Internet. In this example, text classification corresponds to classifying URLs. The HTTP response comprises the following HTTP header fields as well as content for the specified content type (not depicted):

HTTP/1.1 200 OK
Date: Fri, 1 Apr. 2022 2:23:01 GMT
Last-Modified: Thu, 31 Mar. 2022 1:23:23 GMT
Content-Length: 231
Content Type: JavaScript
Connection: Closed The HTTP response header fields indicate a successful OK (200) response status code, dates of access and last modification, a content length of 231 bytes, a content type of "JavaScript", and that the HTTP connection is closed. When processing the example text document 150, the natural language parser 102 can be configured to identify and extract HTTP header fields. Additionally, the natural language parser 102 can have a configuration for multiple content types (e.g., JavaScript, HyperText Markup Language (HTML), Cascading Style Sheets (CSS), etc.). In each of these configurations, when processing the content following the HTTP header fields, the natural language parser 102 extracts functional tokens according to syntax for respective content types/programming language.

The embedding vector model 104 receives tokens extracted from the text documents 121 by the natural language parser 102 and embeds the tokens in numerical space. The embedding vector model 104 can use machine-learning based embeddings such as Word2vec that map tokens that are semantically similar to numerical vectors that are close (e.g., according to the Euclidean norm). In some embodiments, statistical importance metrics such as term frequency-inverse document frequency can be used to weight or modify embedding vectors. For the example text document 150, the embedding vector model 104 can use malware classifiers to determine probabilities that tokens in the content of the HTTP response indicate malicious activity and these probabilities can also be included in the embedding vectors. The embedding vector model 104 generates document A embedding vectors 101A, document B embedding vectors 101B, and embedding vector hyperparameters 111. The embedding vector hyperparameters 111 comprise a number of embedding vectors for each text document (e.g., an input size) that will determine window sizes and stride lengths for corresponding adaptive pooling layers.

The adaptive pooling layer processor 106 receives the embedding vector hyperparameters 111 and uses them to generate a window size and stride length according to the input size and output size. The adaptive pooling layer processor 106 has a hard-coded output size (e.g., 2500) as a part of model architecture that is uniform across all text documents regardless of the number of tokens (thus, embedding vectors) extracted from each text document. For the naïve adaptive pooling algorithm, the window size w is chosen as w=⌈h/a⌉, where h is the input size in number of embedding vectors and a is the output size in number of embedding vectors, and the stride length s=w is chosen to be the same as the window size. For this algorithm, p=h mod w padding vectors are padded at the end. The adaptive pooling layer processor 106 then includes w, s, and p in the adaptive pooling layer hyperparameters 113.

For the optimal adaptive pooling algorithm, there are two candidate choices for the pair (s,w) and the candidate with the lowest window size w is chosen (with ties in window size w broken by lowest stride length s):

$$(s, w) = \left(\left\lfloor \frac{h}{a} \right\rfloor, \left\lceil h - (a-1)\left\lfloor \frac{h}{a} \right\rfloor \right\rceil\right) \quad \text{Candidate 1}$$

$$(s, w) = \left(\left\lceil \frac{h}{a} \right\rceil, \left\lceil \frac{h}{a} \right\rceil\right) \quad \text{Candidate 2}$$

For both candidates, the number of padding vectors is p=w+(a−1)s−h. The second candidate is verified as a valid candidate by checking the condition $$\left\lceil \frac{h}{a} \right\rceil < \frac{h}{a-1}$$

and if this condition fails, the second candidate is invalid and the first candidate is used. This condition ensures that the number of windows using the given window size, stride length, and number of padding vectors is equal to a for the second candidate. The adaptive pooling layer processor 106 then includes w, s, and p in the adaptive pooling layer hyperparameters 113.

The intuition for these choices of first and second candidates for the optimal adaptive pooling algorithm is the following. The condition that incrementing the windows with a stride length a number of times equal to the output size will cover the input size can be expressed as $$w+(a-1)s \geq h$$

In other words, $$a \geq \frac{h-w}{s} + 1$$

Note that w and s are chosen such that this inequality is as close to equality as possible so that the number of resulting windows will not overshoot the input size excessively resulting in additional padding vectors. The property of making the inequality as tight as possible is expressed as the constraint:

$$a = \left\lceil \frac{h-w}{s} + 1 \right\rceil$$

It can be shown that the resulting number of padding vectors is consistent with the aforementioned choice p=w+(a−1)s−h. The above constraint can be enforced by the following two inequalities $$a \geq \frac{h-w}{s} + 1$$

$$a - 1 < \frac{h-w}{s} + 1$$

Adding the constraints that the window size is at least the stride length (otherwise vector entries are missed in the pooling operations), and that the window size and stride length are positive integers, there is the following integer linear program for minimizing the window size subject to these constraints $$\min w$$

$$\text{s.t. } a \geq \frac{h-w}{s} + 1$$

$$a - 1 < \frac{h-w}{s} + 1$$

$$w \geq s$$

$$w, s \in Z$$

$$w, s \geq 1$$

Note that generalized solving of integer linear programs is NP-complete, so that engineering the first and second candidate solutions such that one of them is the optimal solution is desired to efficiently solve this integer linear program.

Figure 2:
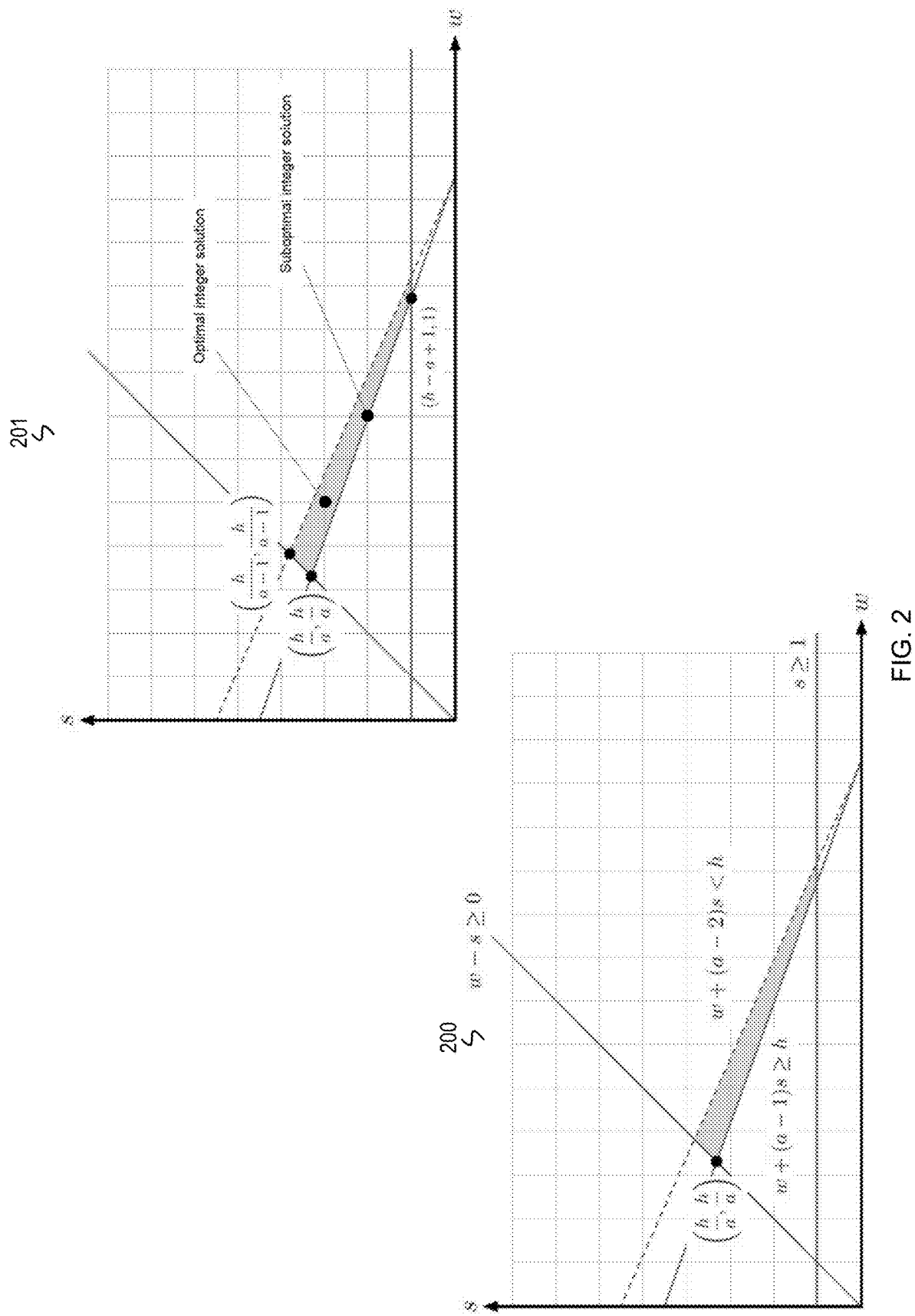
FIG. 2 depicts graph representations of a search space of an optimization program for determining window size and stride length according to an optimized adaptive pooling algorithm.

We now refer to FIG. 2 which depicts graph representations of a search space of an optimization program for determining window size and stride length according to an optimized adaptive pooling algorithm. Graph representation 200 depicts the convex intersection of the inequalities given by the above integer linear program as well as the optimal solution (s, w)=(h/a, h/a) (ignoring for now the constraint that s and w are integers). Note that when h/a is an integer, i.e., the input size divides the output size, this choice is the optimal solution and the optimal adaptive pooling algorithm gives the same solution as the naïve adaptive pooling algorithm. Graph representation 201 depicts the optimal integer solution to the integer linear program above and a suboptimal integer solution. Note that generalized integer linear programs are NP-complete so this integer linear program cannot be solved efficiently using typical optimization solvers. The first candidate (s, w) is chosen by taking the first integer s above the optimal h/a (i.e., $\lceil h/a \rceil$) and determining the minimal corresponding w such that (s, w) fits the integer linear program constraints. The second candidate (s, w) is chosen similarly by choosing the first integer s below the optimal h/a (i.e., $\lfloor h/a \rfloor$). Due to the constraints, any other choices of s will result in a larger minimal integer w for that choice, therefore at least one of the candidates must be the optimal solution.

Referring now back to FIG. 1, the classifier 110 receives the adaptive pooling layer hyperparameters 113 and uses them to generate adaptive pooling layers including adaptive pooling layer A 105A and adaptive pooling layer B 105B. The adaptive pooling layers 105A, 105B include input vectors 107A, 107B, pooling operations 109A, 109B, and output layers 111A, 111B respectively. For adaptive pooling layer A 105A, h=7, a=4, w=2, s=2, and p=1. For adaptive pooling layer B 105B, h=9, a=4, w=3, s=2, and p=0. Note that these are consistent with the formulas for the optimal adaptive pooling algorithm. For adaptive pooling layer A 105A, the optimal algorithm gives first and second candidates (s, w)=(1,4), (2,2), respectively, so that (2,2) has the lower window size (the condition for the second candidate gives 2<7/3 which is satisfied), and for adaptive pooling layer B 105B, the optimal algorithm gives first and second candidates (s, w)=(2,3), (3,3), respectively, so that the first candidate having lower stride length is chosen. For each of the adaptive pooling layers 105A, 105B, the windows are indicated by dashed lines in the pooling operations 109A, 109B. Example pooling operations 115 include a maximum of two entries Max(X,Y) and an average of two entries Avg(X,Y). Other pooling operations are anticipated by the present disclosure, for instance taking an entry-wise Euclidean of input vectors within each window, taking an entry-wise minimum of input vectors within each window, etc.

The input vectors 107A, 107B are output to output layers 111A, 111B after the pooling operations 109A, 109B, respectively. While depicted as individual elements (boxes), elements in the input vectors 107A, 107B and output layers 111A, 111B comprise vectors with dimension equal to the dimension of embedding vectors generated by the embedding vector model 104.

As the classifier 110 generates adaptive pooling layers corresponding to hyperparameters indicated in the adaptive pooling layer hyperparameters 113, embedding vectors for corresponding documents are fed through the adaptive pooling layers and, subsequently, the remaining layers of the classifier 110 (e.g., document A embedding vectors 101A into adaptive pooling layer A 105A and document B embedding vectors 101B into adaptive pooling layer B 105B). The operations for determining window size in both the naïve and optimal pooling algorithms are efficient (constant time complexity) and therefore generating adaptive pooling layers occurs with minimal computational latency. In some embodiments, the adaptive pooling layer processor 106 is executed at the classifier 110 based on input sizes of incoming embedding vectors for documents such as document embedding vectors 101A, 101B. Determining window size and stride length for additional inputs can occur in tandem with the pooling operations.

An example naïve adaptive pooling algorithm that additionally performs averaging pooling operations at the adaptive pooling layer (as implemented, for instance, by the classifier 110 as it receives embedding vectors) is the following where e is the length of embedding vectors, X is the matrix of embedding vectors for a document, and Z is a matrix of outputs:

---
Algorithm 1 Naïve Adaptive Pooling Algorithm
---

Given $X \in \mathbb{R}^{h \times e}$, a
Output $Z \in \mathbb{R}^{a \times e}$
$w = \lceil h/a \rceil$
$p = h \bmod w$
if $p > 0$ then
   append X with padding vector of size p×e
end if
for each stacked (non-intersecting) submatrix $\{M_i\}_i$ of X of size w×e do
   average current submatrix $M_i$ along first dimension to generate $\tilde{M}_i$
end for
Z = stacked $\{\tilde{M}_i\}_i$
Return Z

---

An example optimal adaptive pooling algorithm that additionally performs averaging pooling operations at the adaptive pooling layer is the following:

---
Algorithm 2
Optimal Adaptive Pooling Algorithm
---

Given $X \in \mathbb{R}^{h \times e}$, a
Output $Z \in \mathbb{R}^{a \times e}$
if $h \leq a$ then
   s, w = (1, 1)
else $$candidate1 = \left(\left\lfloor \frac{h}{a} \right\rfloor, \left\lceil h - (a-1)\left\lfloor \frac{h}{a} \right\rfloor \right\rceil\right)$$

if $\left\lfloor \frac{h}{a} \right\rfloor < \frac{h}{a-1}$ then

---
Algorithm 2
Optimal Adaptive Pooling Algorithm
---

$$candidate2 = \left(\left\lceil \frac{h}{a} \right\rceil, \left\lceil \frac{h}{a} \right\rceil\right)$$

s, w = argmin$_w$(candidate1, candidate 2) (tie broken by smaller s)
  else
   s, w = candidate 1
  end if
end if
$p = w + (a - 1)s - h$
if $p > 0$ then
   append X with padding vector of size p×e
end if
for each submatrix $\{M_i\}_i$ of X of size w×e spaced according to stride length s do
   average current submatrix $M_i$ along first dimension to generate $\tilde{M}_i$
end for
Z = stacked $\{\tilde{M}_i\}_i$
Return Z

---

The above algorithms are depicted for averaging pooling operations, but embodiments are not so limited. Embodiments can use other pooling operations, such as a maximum operations within each window.

The operations for preprocessing and generating adaptive pooling layers for text documents throughout FIG. 1 can be performed for training, testing, and at deployment of the classifier 110. Text documents can be split into training and testing sets, and the size of the training and testing sets can depend on a number of available/labelled text documents 121, a number of internal parameters/complexity of the classifier 110, a desired training time, a computational load of an environment performing the training and testing of the classifier 110, etc. Text documents 121 can be separated into batches for which, after inputting each batch into the classifier 110 via the preprocessing and adaptive pooling layer generation steps, a loss is computed and back propagation according to the loss occurs through the layers of the classifier 110. Training can occur across batches and across epochs (i.e., iterations through the training set) until a desired training error (according to the loss function for each batch) and testing (generalization) error are achieved. Based on training and testing errors, layers in the classifier 110 can be modified for increased or decreased classifier complexity (e.g., as represented by the number of internal weights that are trained). The classifier 110 can comprise any neural network architecture effective for NLP, for instance including Rectified Linear Unit (ReLU) layers, fully connected layers, etc. Although described as a neural network, the classifier 110 can be any classifier that has an adaptive pooling layer.

FIGS. 3-7 are flowcharts of example operations for various aspects of the disclosed adaptive pooling. The example operations are described with reference to an adaptive pooling layer processor, a natural language processor, and a classifier for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The descriptions of embedding vectors and padding vectors in FIGS. 3-5 and 7 as vectors that form matrices are abstractions for the purposes of illustration and any appropriate data structure running in code can be used to store and perform operations on these vectors. Any logical ordering and stacking along various dimensions in code can be performed according to the data structure(s) and techniques for efficiently performing pooling operations on embedding and padding vectors are anticipated by the present disclosure. For instance, during maximum pooling operations, an element-wise maximal vector can be maintained inline for each window as the embedding and padding vectors are iterated through along the input, and previously seen embedding and padding vectors can be erased from memory once factored into element-wise maximal vectors for corresponding windows.

Figure 3:
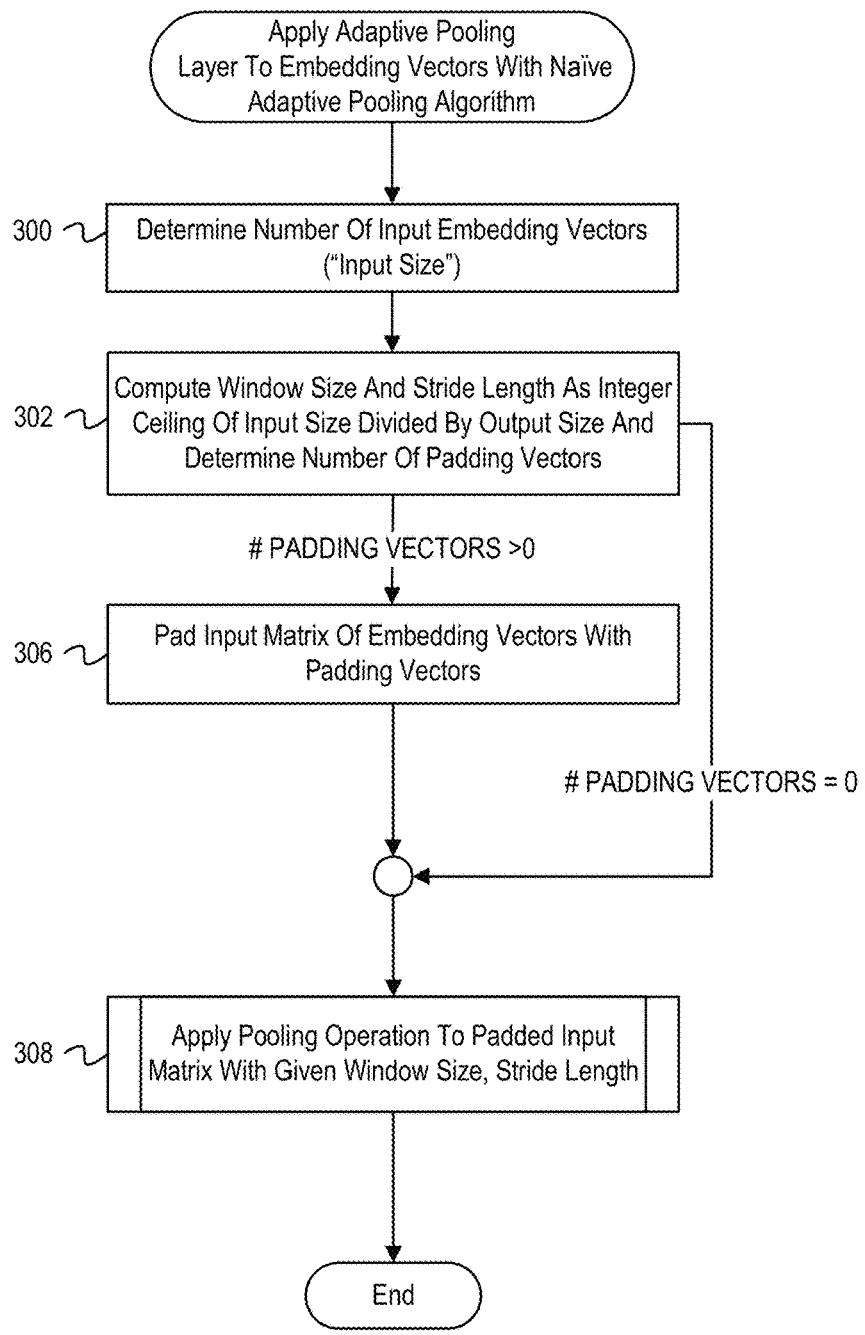
FIG. 3 is a flowchart of example operations for applying an adaptive pooling layer with a naïve adaptive pooling algorithm.

FIG. 3 is a flowchart of example operations for applying an adaptive pooling layer with a naïve adaptive pooling algorithm. At block 300, an adaptive pooling layer processor determines a number of input embedding vectors at an adaptive pooling layer as an input size. The input size can be detected by a component on a natural language processor that generates the embedding vectors with NLP and can be passed to the adaptive pooling layer processor as a hyperparameter alongside the embedding vectors (e.g., in batches of documents of embedding vectors). In some embodiments, the adaptive pooling layer processor determines whether the input size is greater than the output size (i.e., that compression will be used). If the input size is less than or equal to the output size, then the adaptive pooling layer is omitted from classification and operations in FIG. 3 are complete.

At block 302, the adaptive pooling layer processor computes a window size and stride length as the integer ceiling of the input size divided by the output size and additionally determines a number of padding vectors to be appended to the embedding vectors. The number of padding vectors is determined as the remainder when dividing the input size by the output size to compute the window size. The stride length is set equal to the window size, so that during the pooling operation, the windows will be disjoint and none of the embedding vectors in the input are skipped. If the number of padding entries is positive, then flow proceeds to block 306. Otherwise, flow proceeds to block 308.

At block 306, the adaptive pooling layer processor pads the input matrix of embedded vectors with padding vectors. The padding vectors can be chosen as vectors of zeros of length equal to the length of the embedded vectors. The padding vectors can be appended to the bottom of the stack of embedding vectors in the input matrix. For instance, when there are h input embedding vectors of length e (such that a matrix of stacked embedding vectors has dimension hxe) and p padding vectors, then the matrix Z of dimension (h+p)xe resulting from appending the padding vectors to the bottom of the input matrix consists of an upper submatrix of dimension hxe comprising the input matrix and a lower submatrix of dimension pxe of padding vectors (note that p+h divides e so that windows can be created from Z with the prescribed window size). Although described as stacked vertically, the embedding vectors can alternatively be stacked horizontally, and padding vectors can be appended to the top, bottom, and sides of the embedding vectors depending on orientation.

At block 308, the adaptive pooling layer processor applies a pooling operation to the padded input matrix with the given window size and stride length. The operations at block 308 are described in greater detail with reference to FIG. 5.

Figure 4:
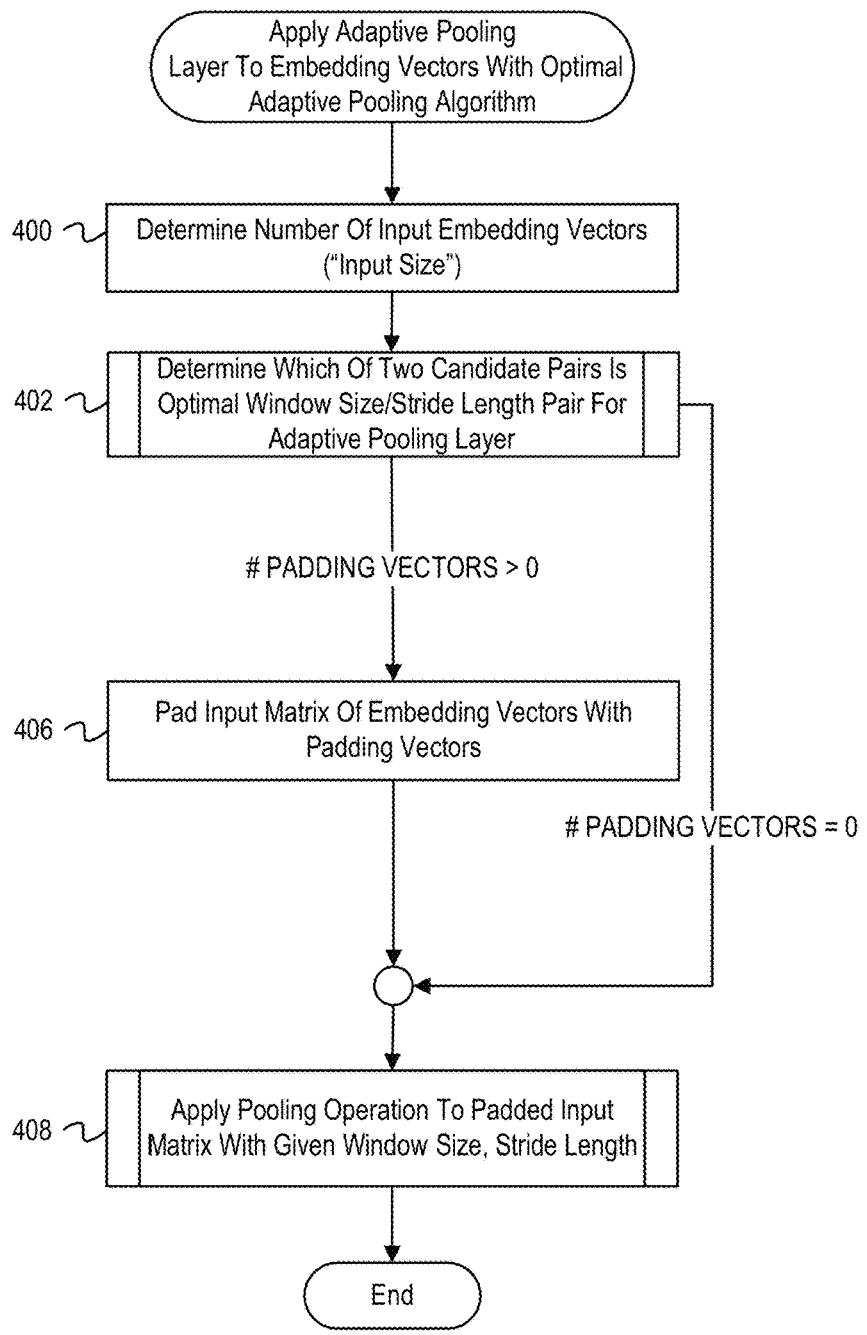
FIG. 4 is a flowchart of example operations for applying an adaptive pooling layer to embedding vectors with an optimal adaptive pooling operation.

FIG. 4 is a flowchart of example operations for applying an adaptive pooling layer to embedding vectors with an optimal adaptive pooling operation. At block 400, an adaptive pooling layer processor determines a number of input embedding vectors as an input size. The operations at block 400 can occur similarly to the operations described at block 300 in reference to FIG. 3.

At block 402, the adaptive pooling layer processor determines which of two candidate pairs is an optimal window size/stride length pair for an adaptive pooling layer. The operations at block 402 are described in greater detail with reference to FIG. 6. Once an optimal window size/stride length pair is determined, then a number of padding vectors p is given by the formula p=w+(a−1)s−h where p is the number of padding vectors, w/s are the optimal window size/stride length in the optimal window size/stride length pair, a is the output size, and h is the input size. If the number of padding vectors is greater than zero, then flow proceeds to block 406. Otherwise, flow proceeds to block 408.

At block 406, the adaptive pooling layer processor pads an input matrix of the embedding vectors with padding vectors. For instance, if the input matrix is of size hxe (e is the length of each embedding vector), then the bottom of the input matrix can be appended with a matrix of padding vectors (also length e) of size pxe. The input matrix can be appended from any direction (top, bottom, right, left) depending on the orientation of the embedding vectors to generate a padded input matrix.

At block 408, the adaptive pooling layer processor applies a pooling operation to the padded input matrix with the given window size and stride length. The operations at block 408 are described in greater detail with reference to FIG. 5.

Figure 5:
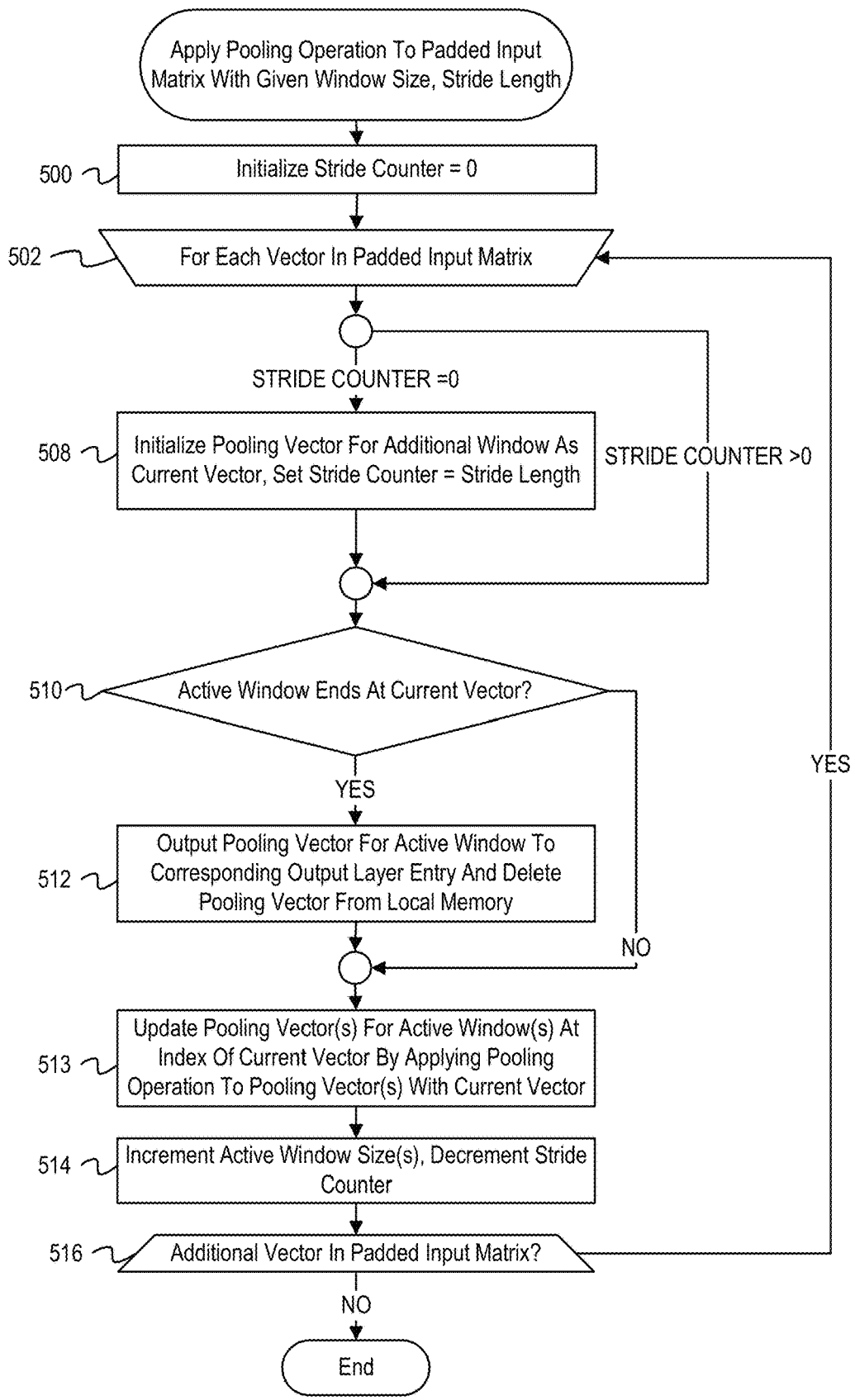
FIG. 5 is a flowchart of example operations for applying a pooling operation to a padded input matrix with a given window size, stride length

FIG. 5 is a flowchart of example operations for applying a pooling operation to a padded input matrix with a given window size, stride length. FIG. 5 depicts example operations for applying pooling operations that can be applied to windows sequentially by each vector in the window while discarding previously seen vectors, for instance when applying averaging and maximum pooling operations. For other embodiments where pooling operations are functions that process all inputs within each window simultaneously, windows can be grouped from a padded input matrix using the given window size and stride length first, and instead of iterating through vectors in the padded input matrix, flow proceeds by iterating through each window and applying pooling operations at each window.

At block 500, the adaptive pooling layer processor initializes a stride counter to 0. The stride counter determines a number of vectors until a new window is initialized (as determined by the given stride length). The stride counter is initialized to 0 so that the vector at a first iteration of the for loop in FIG. 5 belongs to a corresponding first window, and the stride counter will subsequently be incremented to the stride length.

At block 502, the adaptive pooling layer processor begins iterating through vectors in the padded input matrix. While referred to as a padded input matrix, when there are no padding vectors the padded input matrix is the same as the input matrix. If the stride counter is equal to 0, flow proceeds to block 508. Otherwise, flow proceeds to block 510.

At block 508, the adaptive pooling layer processor initializes a pooling vector for an additional window as the current vector and sets the stride counter equal to the stride length. In embodiments where the pooling operation is not an averaging or maximum operation, the pooling vector can be initialized to a function of the current vector corresponding to the pooling operation (e.g., an element-wise square of the current vector). The additional window is initialized with a size of 0.

At block 510, the adaptive pooling layer processor determines whether an active window ends at the current vector.

This determination is made based on whether an active window in an index maintained by the adaptive pooling layer processor has a window size equal to the given window size. If an active window ends at the current index, flow proceeds to block 512. Otherwise, flow proceeds to block 513.

At block 512, the adaptive pooling layer processor outputs the pooling vector for the active window to a corresponding output layer entry and deletes the pooling vector from local memory. The adaptive pooling layer processor additionally deletes the window size of the active window and any other metadata (e.g., an identifier) from an index. The index of the output layer entry is determined sequentially by the number of previously seen windows and is incremented as pooling vectors are added to the output layer. For instance, the adaptive pooling layer processor can maintain a number n of previously seen windows in memory and can output the pooling vector to the nth entry of the output layer (using zero-based indexing) before incrementing to n+1 previously seen windows in memory.

At block 513, the adaptive pooling layer processor updates pooling vector(s) for active window(s) at the index of the current vector by applying a pooling operation to the pooling vector(s) with the current vector. The adaptive pooling layer processor maintains an index of active windows by current size as well as corresponding pooling vector(s) in memory. The pooling operation is applied to update the pooling vector(s) (not including any windows initialized at the current vector) with the current vector. For instance, for averaging, the adaptive pooling layer processor can elementwise add the current vector with its entries divided by the window size to the pooling vector(s).

At block 514, the adaptive pooling layer processor increments window size(s) for active window(s) and decrements the stride counter. Note that active windows initialized at the current vector will have their window size incremented to 1 to reflect the window size corresponding to the current vector.

At block 516, the adaptive pooling layer processor determines whether there is an additional vector in the padded input matrix. If there is an additional vector, flow proceeds to block 502. Otherwise, the flow in FIG. 5 is complete.

Figure 6:
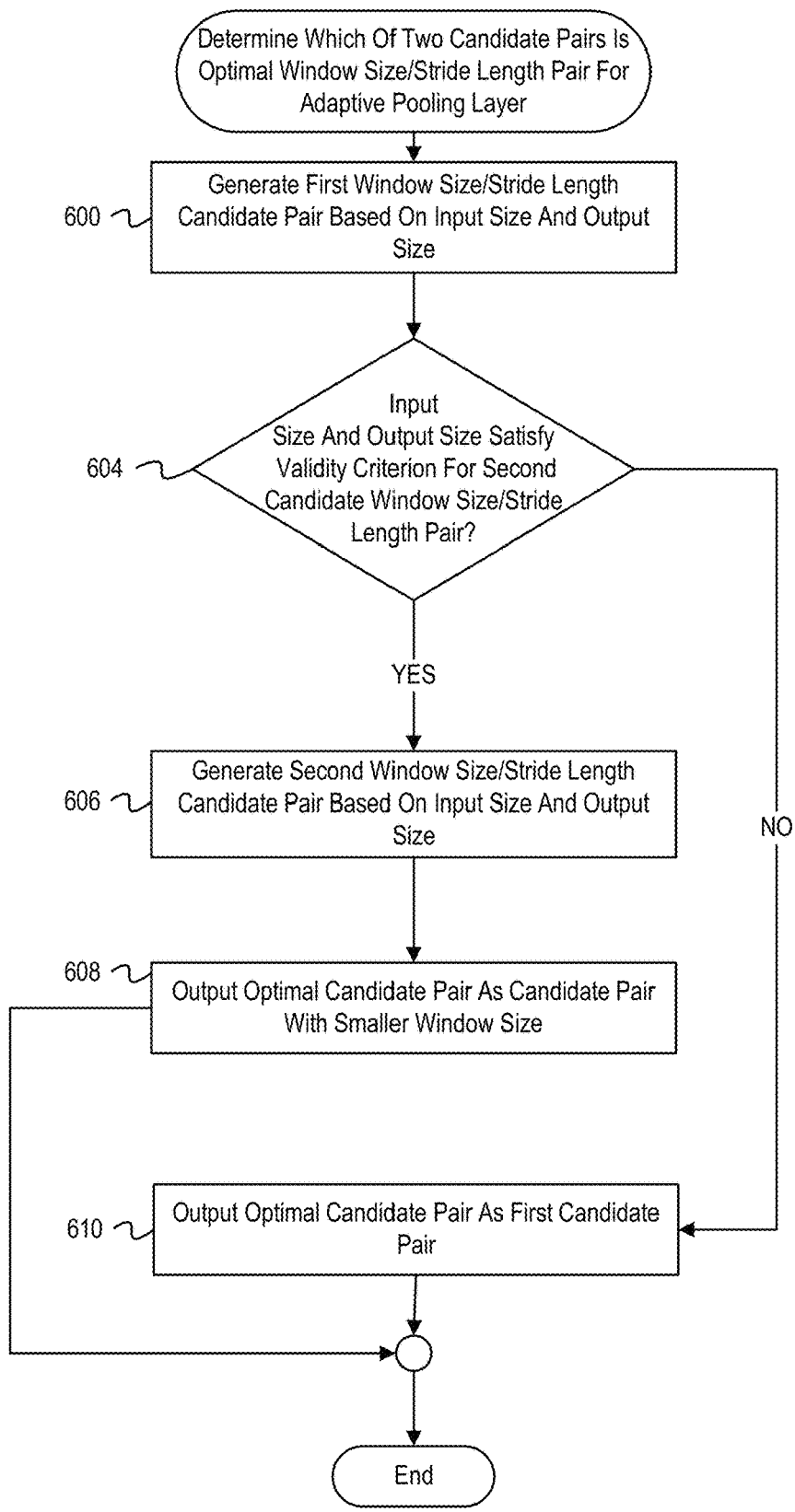
FIG. 6 is a flowchart of example operations for which of two candidate pairs is an optimal window size/stride length pair for an adaptive pooling layer.

FIG. 6 is a flowchart of example operations for determining which of two candidate pairs is an optimal window size/stride length pair for an adaptive pooling layer. At block 600, an adaptive pooling layer processor generates a first window size/stride length candidate pair based on an input size and output size for the adaptive pooling layer. The output size is fixed while the input size varies across inputs to the adaptive pooling layer, resulting in distinct candidate pairs. The first candidate pair is chosen as $$(s, w) = \left( \left\lfloor \frac{h}{a} \right\rfloor, \left\lceil h - (a-1) \left\lfloor \frac{h}{a} \right\rfloor \right\rceil \right),$$

where s is the stride length, w is the window size, h is the input size, and a is the output size. Different criteria than the criteria resulting in the aforementioned integer linear program that gives the first candidate pair can be used (for instance, by altering the constraints that minimize padding vectors to instead minimize window overlap), spawning different formulae for computing candidate pairs. In some embodiments, more or less than 2 candidate pairs are computed.

At block 604, the adaptive pooling layer processor determines whether the input and output sizes satisfy a validity criterion for a second candidate window size/stride length pair. The validity criterion for the second candidate is that $$\left\lceil \frac{h}{a} \right\rceil < \frac{h}{a-1}$$

For embodiments where the candidate pairs are generated by different means (e.g., by considering different constraints and minimizations when constructing an integer linear program for determining window size and stride length), more candidate pairs and less candidate pairs can have associated criteria. If the input size and output size satisfy the validity criterion, flow proceeds to block 606. Otherwise, flow proceeds to block 610.

At block 606, the adaptive pooling layer processor generates a second window size/stride length candidate pair based on the input size and output size. For instance, the second candidate pair corresponding to the above first candidate pair and validity criterion is $$(s, w) = (\lceil h/a \rceil, \lceil h/a \rceil).$$

At block 608, the adaptive pooling layer processor outputs an optimal candidate pair as the candidate pair with a smaller window size. In embodiments where the window size is the same for the first candidate pair and second candidate pair, the candidate pair with the lowest stride length is chosen. Choosing the candidate pair with the smallest window size minimizes loss of semantic information at the adaptive pooling layers due to pooling operations being applied to large windows. In certain degenerate examples, as the input size increases, one of the candidate pairs can have a window size arbitrarily large in comparison to the other candidate pair. To exemplify, when h=9999, a=2500, then (3,2502) is the first candidate pair and (4,4) is the second candidate pair so that the second candidate pair is chosen. This example generalizes to arbitrarily large input size, for instance h=99999 a=25000, h=999999 a=250000, etc. where the stride length stays constant while the window size grows larger and larger.

At block 610, the adaptive pooling layer processor outputs the optimal candidate pair as the first candidate pair. As noted in the foregoing, in embodiments where the second candidate pair fails the validity criterion in block 604, the first candidate pair is guaranteed to be the solution of an integer linear program that minimizes window size. The flow in FIG. 6 is complete.

Figure 7:
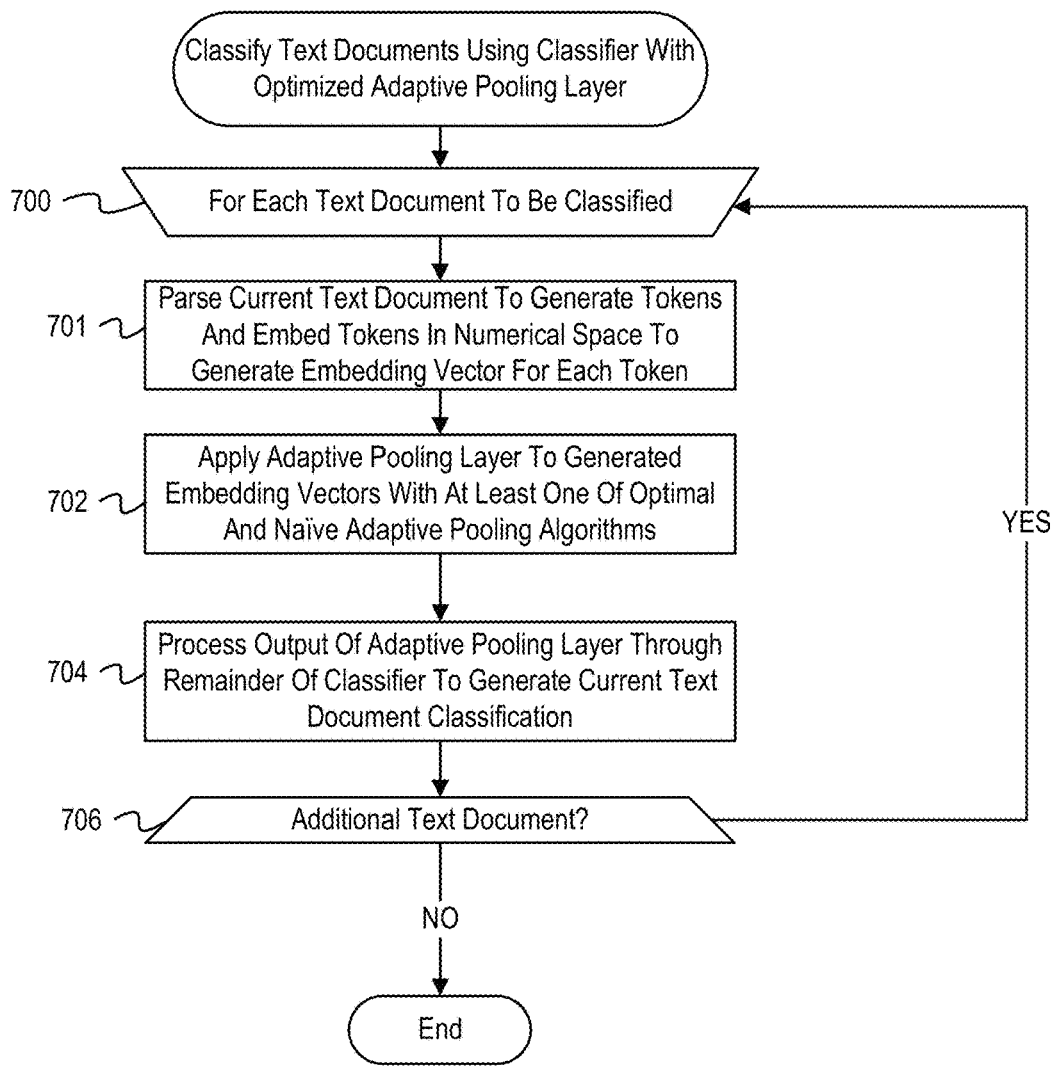
FIG. 7 is a flowchart of example operations for classifying a text document using a classification model with an optimized adaptive pooling layer.

FIG. 7 is a flowchart of example operations for classifying a text document using a classifier with an optimized adaptive pooling layer. At block 700, a natural language processor begins iterating through text documents to be classified. Although this operation is described at the natural language processor, a separate component such as a classifier or a component that handles data processing can iterate through text documents. The example operations at each iteration occur at blocks 701, 702, and 704.

At block 701, the natural language processor parses a current text document to generate tokens and embeds tokens in numerical space to generate an embedding vector for each token. The natural language processor can remove ASCII characters with character codes in a specified range (e.g., non-alphanumeric characters) and generate tokens as remaining consecutive character strings above a threshold length (e.g., 2) separated by spaces, punctuation, removed characters etc. The natural language processor can check tokens against an index of allowable tokens and remove tokens missing in the index. The natural language processor can additionally be configured to extract tokens according to response formats for Internet protocols (e.g., HTTPS) by extracting and associating tokens with corresponding metadata fields. Tokens written in distinct programming languages can be standardized across the programming language using a table that maps tokens in multiple programming languages to a single standardized token. The resulting tokens can be embedded into numerical space using a machine learning algorithm such as Word2vec that preserves semantic similarity between tokens via closeness in the embedded (numerical) space.

At block 702, a classifier applies an adaptive pooling layer to the generated embedding vectors with at least one of an optimal pooling algorithm and a naïve pooling algorithm. The classifier can be a deep neural network or any other classification model configured to have an adaptive pooling layer. Applying the naïve pooling algorithm and the optimal pooling algorithm can be according to the operations depicted in FIGS. 3 and 4, respectively. Choosing between the naïve and optimal pooling algorithms can be based on implementation details. For instance, the naïve pooling algorithm requires less operations and is simpler to implement. Correspondingly, the naïve pooling algorithm can be used for lower complexity (e.g., less layers/smaller layer size, lower number of internal parameters) neural networks for lightweight, low-latency classifications. Conversely, the optimal pooling algorithm is lengthier to implement and can be used in a higher complexity neural network.

At block 704, the output of the adaptive pooling layer is processed through the remainder of the classifier to generate a current text document classification. For instance, when the classifier is a neural network, the output of the adaptive pooling layer is computed through the remaining layers according to internal weights at each layer to give a final output that comprises a vector of classification probabilities. The category with highest probability of classification can then be chosen as a category corresponding to the current text document. Classification of text documents using the classifier with the adaptive pooling layer can occur during training, testing, and/or deployment of the classifier. During training and testing, weights at the output layer of the adaptive pooling layer can be updated and, in some embodiments, the architecture (i.e., number of elements in the output layer) can change according to testing and generalization errors of the classifier.

At block 706, the natural language processor determines whether there is an additional text document to be classified. If there is an additional text document, flow proceeds to block 700. Otherwise, the flow in FIG. 7 is complete.

Variations

The terms "input size," "output size," and "window size" are used throughout to refer to number of vectors in inputs, number of vectors in outputs, and number of vectors in windows of the inputs, respectively. In other embodiments, inputs, outputs, and windows can comprise multiple dimensional (e.g., 3-dimensional) objects such that "size" refers to a multi-dimensional measure rather than a 1-dimensional measure of the respective objects. Moreover, in these embodiments "stride length" can instead refer to a vector indicating displacement of windows in higher dimensional space.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 508 and 512 can be performed in parallel or concurrently. With respect to FIG. 5, using counters for window size and stride length can be replaced by pointers indicating windows of vectors based on window size and stride length, and instead of iterating through vectors, iterations can be across windows of vectors aggregated according to the given window size and stride length. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
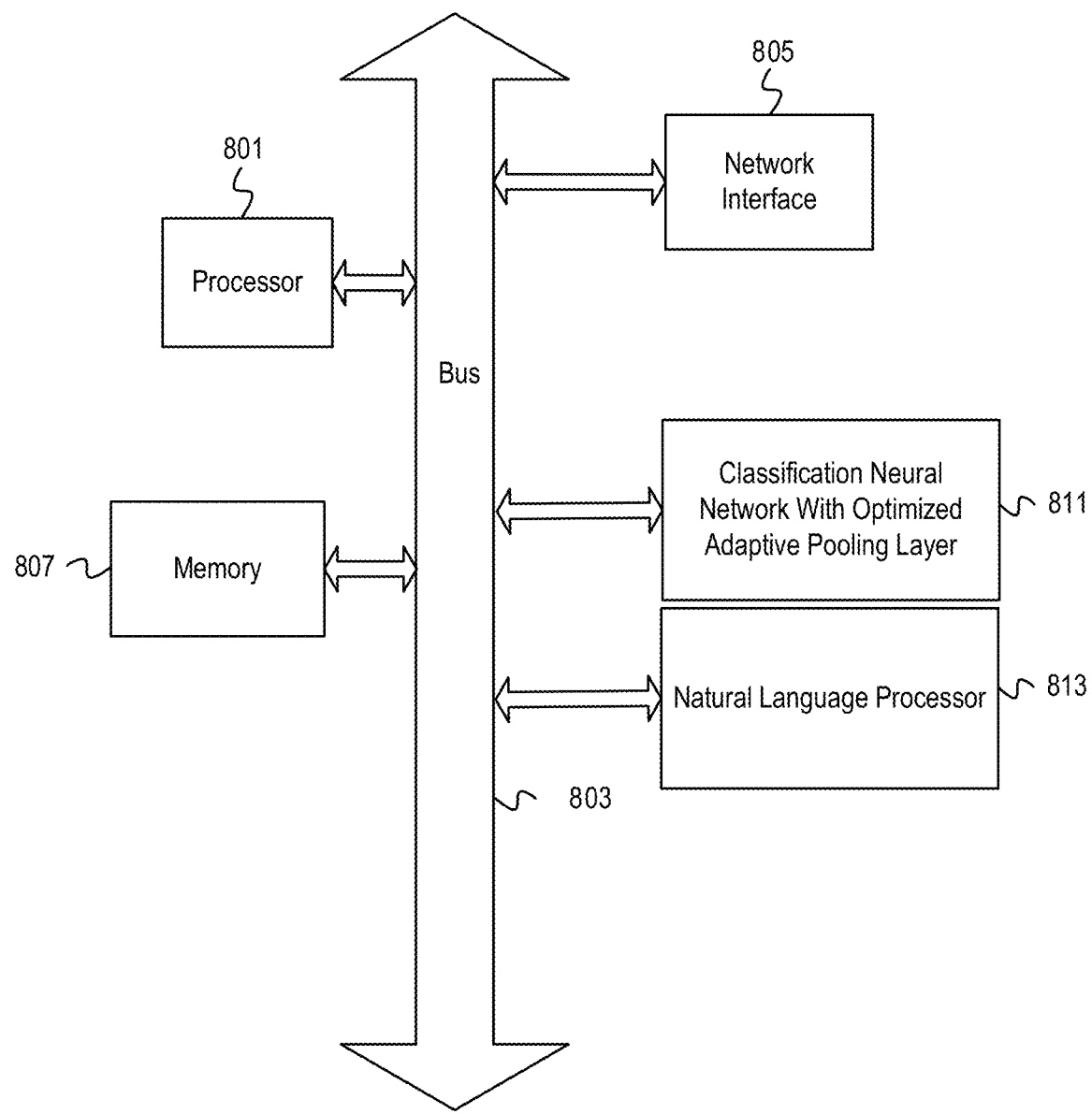
FIG. 8 depicts an example computer system with a natural language processor and a classification neural network with an optimized adaptive pooling layer.

FIG. 8 depicts an example computer system with a natural language processor and a classification neural network with an optimized adaptive pooling layer. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes a classification neural network with an optimized adaptive pooling layer 811 (hereinafter "classifier 811") and a natural language processor 813. The classifier 811 can dynamically determine window size and stride length of an adaptive pooling layer for variably sized inputs according to a naïve and an optimal adaptive pooling algorithm. The natural language processor 813 can generate embedding vectors for text document inputs using NLP and the classifier 811 can input the embedding vectors into the adaptive pooling layer to generate text document classifications. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for determining optimized hyperparameters for adaptive pooling layers using a naïve and an optimal adaptive pooling algorithm as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method to dynamically pool variably sized inputs to reduce padding when classifying text documents, the method comprising:
    training a classifier neural network to classify text documents, wherein training the classifier neural network comprises, for each batch of training data, backpropagating loss through layers of the classifier neural network, wherein the layers of the classifier neural network comprise a pooling layer;
    determining a first window size and a first stride length for a first plurality of input vectors at the pooling layer of the classifier neural network based, at least in part, on the first stride length and the first window size being an integer approximation of a ratio of a number of the first plurality of input vectors to a number of output vectors at the pooling layer, wherein the first plurality of input vectors comprise embedding vectors of one or more text documents, and wherein the first window size and the first stride length reduce padding at the pooling layer;
    applying a pooling operation to subsets of at least the first plurality of input vectors according to the first window size and the first stride length to generate outputs at the pooling layer; and
    processing the outputs at the pooling layer through one or more layers of the classifier neural network to generate a vector of classification probabilities for the one or more text documents.

2. The method of claim 1, wherein the first stride length and the first window size being the integer approximation of the ratio of the number of the first plurality of input vectors and the number of output vectors at the pooling layer is according to the equations $w=\lceil h/a \rceil$ and $s=\lceil h/a \rceil$, wherein w is the first window size, s is the first stride length, a h is the number of the first plurality of input vectors, and a is the number of output vectors at the pooling layer.

3. The method of claim 1, further comprising padding the first plurality of input vectors with a first plurality of padding vectors, wherein applying the pooling operation to subsets of at least the first plurality of input vectors comprises applying the pooling operation to subsets of the first plurality of input vectors and the first plurality of padding vectors.

4. The method of claim 3, wherein a number of the first plurality of padding vectors is according to the equation $p = h \bmod w$, wherein p is the first plurality of padding vectors, h is the number of the first plurality of input vectors, w is the first window size, and mod is the modulo operation.

5. The method of claim 1, further comprising determining a second window size and a second stride length for a second plurality of input vectors at the pooling layer of the classifier neural network based, at least in part, on the second stride length and the second window size being an integer approximation of a ratio of a number of the second plurality of input vectors to the number of output vectors at the pooling layer, wherein the number of the second plurality of input vectors is different from the number of the first plurality of input vectors.

6. The method of claim 1, wherein the pooling operation is at least one of a maximum pooling operation and an averaging pooling operation.

7. The method of claim 1, wherein applying the pooling operation to subsets of at least the first plurality of input vectors according to the first window size and the first stride length to generate outputs at the pooling layer comprises applying the pooling operation to subsets of consecutive vectors of the first window size displaced by the first stride length.

8. A non-transitory computer-readable medium having program code stored thereon, the program code comprising instructions to dynamically pool variably sized inputs to reduce padding when classifying text documents, wherein the instructions to dynamically pool variably sized inputs to reduce padding when classifying text documents comprise instructions to:
  train a neural network to classify text documents, wherein the instructions to train the neural network comprise instructions to, for each batch of training data, backpropagate loss through layers of the neural network, wherein the layers of the neural network comprise a pooling layer;
  determine a first window size and a first stride length for a first plurality of inputs to the pooling layer of the neural network, wherein determining the first window size and first stride length comprises choosing at least one of a first pair of a first candidate window size and a first candidate stride length and a second pair of a second candidate window size and a second candidate stride length, wherein the first candidate stride length and second candidate stride length comprise integer approximations of a ratio of a number of the first plurality of inputs to a number of output vectors at the pooling layer, wherein the first plurality of inputs comprise embedding vectors of one or more text documents, and wherein the first window size and the first stride length reduce padding at the pooling layer;
  apply a pooling operation to windows of at least the first plurality of inputs according to the first window size and the first stride length to generate outputs at the pooling layer; and
  process the outputs at the pooling layer of the neural network through one or more remaining layers of the neural network to generate a vector of classification probabilities for the one or more text documents corresponding to malicious activity.

9. The computer-readable medium of claim 8, wherein the instructions to apply the pooling operation to windows of the first plurality of inputs according to the first window size and the first stride length comprise instructions to,
  pad the first plurality of inputs with a plurality of padding vectors; and
  apply the pooling operation to windows of the first plurality of inputs and the plurality of padding vectors according to the first window size and the first stride length.

10. The computer-readable medium of claim 9, wherein the program code further comprises instructions to determine that the second pair of the second candidate window size and the second candidate stride length satisfies a first criterion to be chosen for the first window size and the first stride length.

11. The computer-readable medium of claim 10, wherein the instructions to choose one of the first pair of the first candidate window size and the first candidate stride length and the second pair of the second candidate window size and the second candidate stride length comprise instructions to,
  determine that the second pair of the second candidate window size and the second candidate stride length satisfies the first criterion; and
  choose one of the first pair of the first candidate window size and the first candidate stride length and the second pair of the second candidate window size and the second candidate stride length having a lower window size.

12. The computer-readable medium of claim 10, wherein the instructions to choose one of the first pair of the first candidate window size and the first candidate stride length and the second pair of the second candidate window size and the second candidate stride length comprise instructions to choose the first pair of the first candidate window size and the first candidate stride length based on a determination that the second pair of the second candidate window size and the second candidate stride length fails the first criterion.

13. The computer-readable medium of claim 10, wherein the first criterion comprises whether the second pair of the second candidate window size and the second candidate stride length satisfies constraints for valid window sizes and stride lengths for the pooling layer.

14. The computer-readable medium of claim 10, wherein the first criterion comprises whether a first equation $$\left\lceil \frac{h}{a} \right\rceil < \frac{h}{a-1}$$

is satisfied, wherein h is a number of the first plurality of inputs, and a is a number of outputs at the pooling layer of the neural network.

15. The computer-readable medium of claim 9, wherein the first pair of the first candidate window size and the first candidate stride length is according to a second equation $(s_1, w_1) = (\lfloor h/a \rfloor, \lceil h-(a-1)\lfloor h/a \rfloor \rceil)$, and the second pair of the second candidate window size and the second candidate stride length is according to a third equation $(s_2, w_2) = (\lceil h/a \rceil, \lceil h/a \rceil)$, wherein $s_1$ is the first candidate stride length, $w_1$ is the first candidate window size, h is a number of the first plurality of inputs, a is a number of outputs at the pooling layer of the neural network, $s_2$ is the second candidate stride length, and $w_2$ is the second candidate window size.

16. The computer-readable medium of claim 8, wherein at least one of the first pair of the first candidate window size and the first candidate stride length and the second pair of the second candidate window size and the second candidate stride length is an optimal solution to an integer linear program minimizing window size subject to window size and stride length satisfying one or more constraints for valid window sizes and stride lengths for the pooling layer.

17. An apparatus comprising:
  a processor; and
  a computer-readable medium having instructions stored thereon that are executable by the processor to cause the apparatus to dynamically pool variably sized inputs to reduce padding when classifying text documents, wherein the instructions to dynamically pool variably sized inputs to reduce padding when classifying text documents comprise instructions executable by the processor to cause the apparatus to,
    train a neural network to classify text documents, wherein the instructions to train the neural network comprise instructions executable by the processor to cause the apparatus to, for each batch of training data, backpropagate loss through layers of the neural network, wherein the layers of the neural network comprise a pooling layer;

determine a first window size and a first stride length for a first plurality of input vectors at the pooling layer of the neural network, wherein the instructions to determine the first window size and the first stride length comprise the instructions executable by the processor to cause the apparatus to determine the first window size and the first stride length according to at least one of an optimal adaptive pooling algorithm and a naïve adaptive pooling algorithm for the pooling layer, wherein the first plurality of input vectors comprise embedding vectors of one or more text documents, and wherein the first window size and the first stride length reduce padding at the pooling layer;

apply a pooling operation to windows of at least the first plurality of input vectors according to the first window size and the first stride length at the pooling layer; and input outputs of the pooling layer into one or more remaining layers of the neural network to generate a to generate a vector of classification probabilities for the one or more text documents corresponding to malicious activity.

18. The apparatus of claim 17, further comprising instructions executable by the processor to cause the apparatus to determine one of the optimal adaptive pooling algorithm and the naïve adaptive pooling algorithm used to determine the first window size and the first stride length based, at least in part, on a number of internal parameters of the neural network.

19. The apparatus of claim 17,
wherein the instructions to determine the first window size and the first stride length according to the naïve adaptive pooling algorithm comprise instructions to determine the first stride length and the first window size as an integer approximation of a ratio of a number of the first plurality of input vectors to a number of output vectors at the pooling layer,
wherein the instructions to determine the first window size and the first stride length according to the optimal adaptive pooling algorithm comprises instructions to choose one of a first pair of a first candidate window size and a first candidate stride length and a second pair of a second candidate window size and a second candidate stride length as the first window size and the first stride length, wherein at least one of the first and second pairs comprises a window size and stride length that are an optimal solution to an integer linear program minimizing window size for the pooling operation.

20. The apparatus of claim 17, wherein the pooling operation is at least one of a maximum pooling operation and an averaging pooling operation.

* * * * *